US011448766B2

(12) United States Patent
Sutherland et al.

(10) Patent No.: US 11,448,766 B2
(45) Date of Patent: *Sep. 20, 2022

(54) ACTUATED SPINNING SENSOR

(71) Applicant: The Government of the United States of America, as represented by the Secretary of Homeland Security, Washington, DC (US)

(72) Inventors: William T. Sutherland, Washington, DC (US); John Bray, Washington, DC (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/373,383

(22) Filed: Jul. 12, 2021

(65) Prior Publication Data
US 2021/0341617 A1    Nov. 4, 2021

Related U.S. Application Data

(63) Continuation of application No. 16/166,930, filed on Oct. 22, 2018, now Pat. No. 11,086,018.

(51) Int. Cl.
*G01S 17/89* (2020.01)
*G01S 7/481* (2006.01)
*G01S 15/00* (2020.01)
*G01S 17/88* (2006.01)
*G01S 17/00* (2020.01)
*G01S 13/00* (2006.01)

(52) U.S. Cl.
CPC ............ *G01S 17/89* (2013.01); *G01S 7/4813* (2013.01); *G01S 7/4817* (2013.01); *G01S 13/00* (2013.01);
(Continued)

(58) Field of Classification Search
CPC ........ G01S 17/89; G01S 17/88; G01S 7/4813; G01S 7/4817; G01S 13/00; G01S 15/00;
(Continued)

(56) References Cited

U.S. PATENT DOCUMENTS

| 7,969,558 | B2 * | 6/2011 | Hall ...................... G01S 7/4813 |
| | | | 356/5.01 |
| 9,588,252 | B2 * | 3/2017 | Ziemkowski ............ G01V 8/18 |
| 9,628,688 | B2 * | 4/2017 | Martin .................. H04N 5/2259 |
| 10,012,723 | B2 * | 7/2018 | Lindskog ................ B64C 39/02 |

(Continued)

FOREIGN PATENT DOCUMENTS

| KR | 20150118544 A | * 10/2015 | ............. G01S 17/74 |
| KR | 20150118544 A | 10/2015 | |

OTHER PUBLICATIONS https://en.wikipedia.org/w/index.php?title=Beam_divergence&oldid=790860228 (Year: 2018).*
(Continued)

*Primary Examiner* — Behrang Badii
*Assistant Examiner* — Jay Khandpur
(74) *Attorney, Agent, or Firm* — Lavanya Ratnam; Kelly G. Hyndman; Robert W. Busby

(57) ABSTRACT

Various embodiments of the present invention are directed towards a system and methods for generating three dimensional (3D) images with increased composite vertical field of view and composite resolution for a spinning three-dimensional sensor, based on actuating the sensor to generate a plurality of sensor axis orientations as a function of rotation of the actuator. The output data from the sensor, such as a spinning LIDAR, is transformable as a function of the actuator angle to generate three dimensional imagery.

20 Claims, 5 Drawing Sheets

(52) U.S. Cl.
CPC .............. *G01S 15/00* (2013.01); *G01S 17/00* (2013.01); *G01S 17/88* (2013.01); *B60R 2300/301* (2013.01); *F05B 2270/804* (2013.01); *F05B 2270/805* (2013.01); *F05B 2270/806* (2013.01)

(58) Field of Classification Search
CPC .............. G01S 17/00; B60R 2300/301; F05B 2270/804; F05B 2270/805; F05B 2270/806
See application file for complete search history.

(56) References Cited

U.S. PATENT DOCUMENTS

| | | | |
|---|---|---|---|
| 10,739,441 B2* | 8/2020 | Nabbe ................... | G01S 17/931 |
| 10,753,733 B2* | 8/2020 | Deering, Jr. ....... | G01B 11/2755 |
| 2015/0059567 A1* | 3/2015 | Fox ........................ | F41H 5/266 |
| | | | 89/41.19 |
| 2019/0098233 A1* | 3/2019 | Gassend .............. | H04N 5/2258 |

OTHER PUBLICATIONS hhttps://en.wikipedia.org/w/index.php?title=Rotation_formalisms_in_three_dimensions&oldid=854726608 (Year: 2018).*
Wikipedia, "Beam divergence", https://en.wikipedia.org/wiki/Beam_divergence, accessed Jul. 9, 2021.
Wikipedia, "Rotation formalisms in three dimensions", https://en.wikipedia.org/wiki/Rotation_formalisms_in_three_dimensions, accessed Jul. 9, 2021.

* cited by examiner

ACTUATED SPINNING SENSOR

CROSS-REFERENCE TO RELATED APPLICATIONS

This application is a continuation of U.S. patent application Ser. No. 16/166,930, filed Oct. 22, 2018, entitled Orbiting Actuated Three-Dimensional Spinning Sensor, which is herein incorporated by reference in its entirety.

GOVERNMENT RIGHTS

The present invention was made by one or more employees of the United States Department of Homeland Security in the performance of official duties. The United States Government has certain rights in this invention.

FIELD OF THE INVENTION

The present invention relates generally to the field of sensors, and in particular the actuation of a sensor to obtain improved three-dimensional images.

BACKGROUND OF THE INVENTION

Three-dimensional (3D) scanning and imagery has become increasingly important to modern computing and robotics. In recent years, 3D sensors, such as spinning LIDARs, have been applied to numerous applications including additive manufacturing, defect detection, autonomous navigation, obstacle detection and avoidance, and target tracking. In the field of additive manufacturing, 3D sensors can be used to create high definition scans of objects to allow automated printing of the objects. In mobile sensing applications, these 3D sensors are typically used for mapping and surveying an environment through which a vehicle, such as self-driving car or drone, is moving. In some instances, the data from these 3D sensors are input into artificial intelligences that have been trained using machine learning techniques. Artificial intelligences can use this information either alone or in combination with other multispectral information to make autonomous decisions.

One common sensor used to generate three-dimensional images is a spinning light detection and ranging (LIDAR) sensor, although other sensors can achieve similar effects. A LIDAR uses one more of lasers and photodiode detectors to measure distances of points in a 3D environment. The lasers are set to rapidly emit pulses of light (photons) in a specific wavelength range, while the light detectors are set to detect photons in the same wavelength range. Based on the time-of-flight of the photons, individual points are identified by measuring the time elapsed between the generation of a light pulse and detection of an apparent returns pulse, if any. The longer the difference, the greater the estimated distance.

With spinning LIDAR, lasers and detectors are typically configured into a sensor array that is spun about an axis to identify numerous points. Alternative configurations of spinning LIDAR include the use of mirror(s) or prism(s) that are spun to reflect or refract the laser(s) in multiple directions to increase the scanning field of view. These components are often rotated at hundreds or thousands of Revolutions Per Minute (RPM). By correlating these measured distances to the orientation of the laser(s) used to measure, numerous points can then be aggregated into a point cloud from which 3D images can be generated. The resolution and detail level of these generated images primarily depends on the density of points within the point cloud. These generated 3D images can accurately represent the distances and shapes of various objects in an environment. A detailed discussion of the operation and the various configurations of a spinning LIDAR can be found in U.S. Pat. No. 7,969,558, incorporated by reference herein.

Numerous multi-beam spinning LIDARs are currently on the market from a variety of manufacturers such as SICK, Hokuyo®, and Velodyne®. While these spinning LIDARs are relatively inexpensive, they possess multiple limitations including that, when spinning, each laser repeatedly samples the same points in the environment. For example, the Velodyne PUCK™ includes 16 lasers at fixed angles spaced 2.0 degrees apart from each other. Consequently, the resultant image obtained by the lasers resembles a set of discrete horizontal lines, and does not resemble a robustly detailed image. Another limitation is that, while the horizontal field of view is often 360° by virtue of spinning the sensor about an axis, the vertical field of view is substantially constrained due to the fixed angles associated with the lasers and sensors. For the Velodyne PUCK™, the vertical field of view is approximately +15 to −15 degrees from horizontal (relative to the vertically oriented axis of rotation) based on the two-degree fixed spacing between each of the 16 lasers mounted to the spinning sensor.

Hobbyist have actuated such types of spinning LIDAR to allow the sensors to sample more of the environment. One method of actuation is to attach spinning LIDARs to robotic arms that pivot the LIDAR in two or three planes. For example, a robotic arm can be used to reposition the spinning LIDAR to enable lasers to sample different spaces.

SUMMARY OF THE INVENTION

The present invention provides an improved operation of a sensor for generating three-dimensional imagery, by actuating a spinning sensor and transforming the sensed data in view of the actuating. Various embodiments enable three-dimensional sensors to be actuated to improve the usefulness of the sensed data and transformed resultant imagery. As used herein, images or imagery includes underlying data, corresponding to a visual representation to present data, such as 3D models or other three-dimensional mathematical constructs.

In an example embodiment, an actuator includes a mount configured to support a rotatable sensor and configured to orient a sensor axis of the sensor at a non-zero inclination angle relative to a rotation axis of the mount. The actuator includes a rotator configured to rotate the mount about the rotation axis to precess the sensor axis about the rotation axis to achieve a plurality of sensor axis orientations as a function of mount rotation.

In another example embodiment, a system to generate transformed sensor information includes an actuator and a controller. The actuator includes a mount including an offset portion, which extends laterally from a rotation axis about which the mount is configured to rotate, and a support portion, which extends from the offset portion. The support portion is configured to support a rotatable sensor including a sensor axis oriented at a non-zero inclination angle relative to the rotation axis. The actuator also includes a stabilizer including a two-axis gimbal configured to prevent the support portion from rotating along with the mount and to provide a pivot fulcrum for the support portion of the mount to precess about the rotation axis. The actuator further includes a rotator configured to rotate the mount about the rotation axis, to cause the sensor axis to precess about the rotation axis at the inclination angle. The actuator also includes an encoder to identify a mount rotation angle about the rotation axis. The system further includes a controller configured to generate transformed sensor information based on transforming uncompensated sensor information as a function of the mount rotation angle and the inclination angle.

In yet another example embodiment, a method of generating transformed sensor data includes acquiring, from an encoder of an actuator, a mount rotation angle corresponding to rotation of the mount about a rotation axis, wherein the mount is configured to support a sensor rotatable about a sensor axis oriented relative to the rotation axis by an inclination angle; acquiring, from a data packet generated by the sensor, uncompensated sensor information; transforming the uncompensated sensor information into transformed sensor data based on the mount rotation angle and a sensor offset corresponding to a distance along the sensor axis from a sensor receiver to an intersection of the rotation axis and the sensor axis; generating composite sensor output based on the transformed sensor data, wherein the composite sensor output includes at least one of a composite vertical field of view greater than an uncompensated vertical field of view of the sensor, or a composite resolution greater than an uncompensated resolution of the sensor; and rotating the mount about the rotation axis to cause the sensor axis to precess about the rotation axis at the inclination angle.

Other features and aspects of the invention will become apparent from the following detailed description, which taken in conjunction with the accompanying drawings illustrate, by way of example, the features in accordance with embodiments of the invention. This summary is not intended to identify key or essential features of the claimed subject matter, nor is it intended to limit the scope of the invention, which is defined solely by the claims attached hereto.

BRIEF DESCRIPTION OF THE DRAWINGS

One or more exemplary embodiments of the present invention are described in detail with reference to the following drawings. These drawings are provided to facilitate understanding of the present invention and should not be read as limiting the breadth, scope, or applicability thereof. For purposes of clarity and ease of illustration, these drawings are not necessarily made to scale and certain elements of the present invention may be over- or under-emphasized.

These drawings are not intended to be exhaustive or to limit the invention to the precise form(s) disclosed. It should be understood that the present invention can be practiced with modification and alteration, and that the invention is limited only by the claims and the equivalents thereof.

DETAILED DESCRIPTION OF THE INVENTION

Rotatory encoder sensors can provide data representing points that can be aggregated into a point cloud. The point cloud can be represented as various forms of imagery, including 2D renderings, 3D models and video. The example embodiments described herein enable the sensor to operate with a higher spatial resolution, and field of view (FOV), compared to a native resolution and native FOV of the sensor.

The improved sensors can be used for a variety of applications, such as with autonomous vehicles to achieve increased composite sensing resolution, which can extend an effective range for meaningful sensor detection of a driving environment, while also reducing blind spots, e.g., via increased composite vertical FOV of the sensor. The improved sensors also can be used in fully or partially self-navigating robotics. The precessional motion achieved by the example sensors enables the robots to reduce or eliminate their blind-spots, by virtue of the sensor being articulated outward and downward, away from the body of the robot. In yet another application, the improved sensors can be used for monitoring spaces (e.g., secured environments such as air spaces), e.g., by allowing for the detection of unmanned aerial vehicles (UAVs), to enhance protective missions. Other applications include general mapping of structures such as buildings and landscapes, by virtue of achieving higher resolutions to determine the structure and fine details of objects. The improved sensors can achieve a continuous sweep across the space between native resolution points, which would have previously been missing from the collected data, by precessing the spinning sensor. Furthermore, information collected by the sensor can be transformed by a controller and/or software, to allow the sensor to achieve improved performance by translating the uncompensated sensor information to increase the effective resolution and/or FOV. Furthermore, the improved sensors enable near-real-time sensing and monitoring of a full 360-degree observed space, unlike other actuated sensors.

Figure 1:
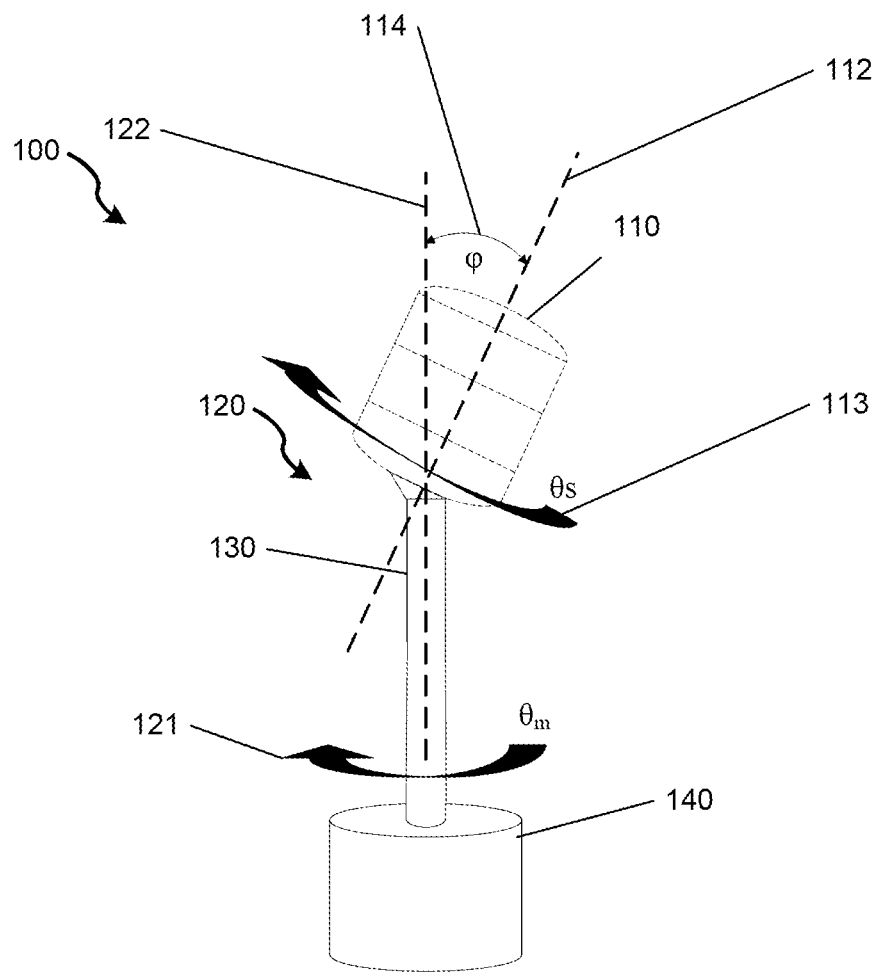
FIG. 1 illustrates an actuator including a mount and a rotator configured to mount a spinning sensor according to an example embodiment.

FIG. 1 illustrates an actuator 100 including a mount 120 and a rotator 140 configured to mount a spinning sensor 110 according to an example embodiment. The mount 120 is configured to support the rotatable sensor 110 and is configured to orient a sensor axis 112 of the sensor 110 at a non-zero inclination angle 114 relative to a rotation axis 122 of the mount 120. The rotator 140 is configured to rotate the mount 120 about the rotation axis 122 to precess the sensor axis 112 about the rotation axis 122, to achieve a plurality of sensor axis orientations 112 as a function of mount rotation, thereby allowing the sensor 110 to achieve an effective resolution greater than a native resolution of the sensor 110, and an effective field of view (FOV) greater than the native FOV of the sensor 110.

In example embodiments, the motion of the actuator 100 causes the sensor 110 to have continuously changing tilt and roll angles (e.g., relative to the horizon), resulting in changes of orientations of the sensor axis 112 in a repeatable, predictable, and measurable way. Notably, the sensor 110 is exposed to sensor data that would have been unresolvable when a non-actuated, i.e., located between or beyond resolvable points. The motion and changes in orientation can be generated by a single motor of the actuator 100, and the orientations of the sensor axis 112 (e.g., tilt and roll angles) can be derived from measurements of a single angle of the rotation axis 122 (i.e., the mount rotation angle $\theta_m$ 121), which can be identified using a single sensor/encoder, or taken from the rotator 140 (e.g., a servo motor) itself. Accordingly, the design and construction of the actuator 100 is very compact and straightforward, to obtain a plurality of sensor orientations to increase resolution and FOV via the rotation of a single actuator.

Figure 2:
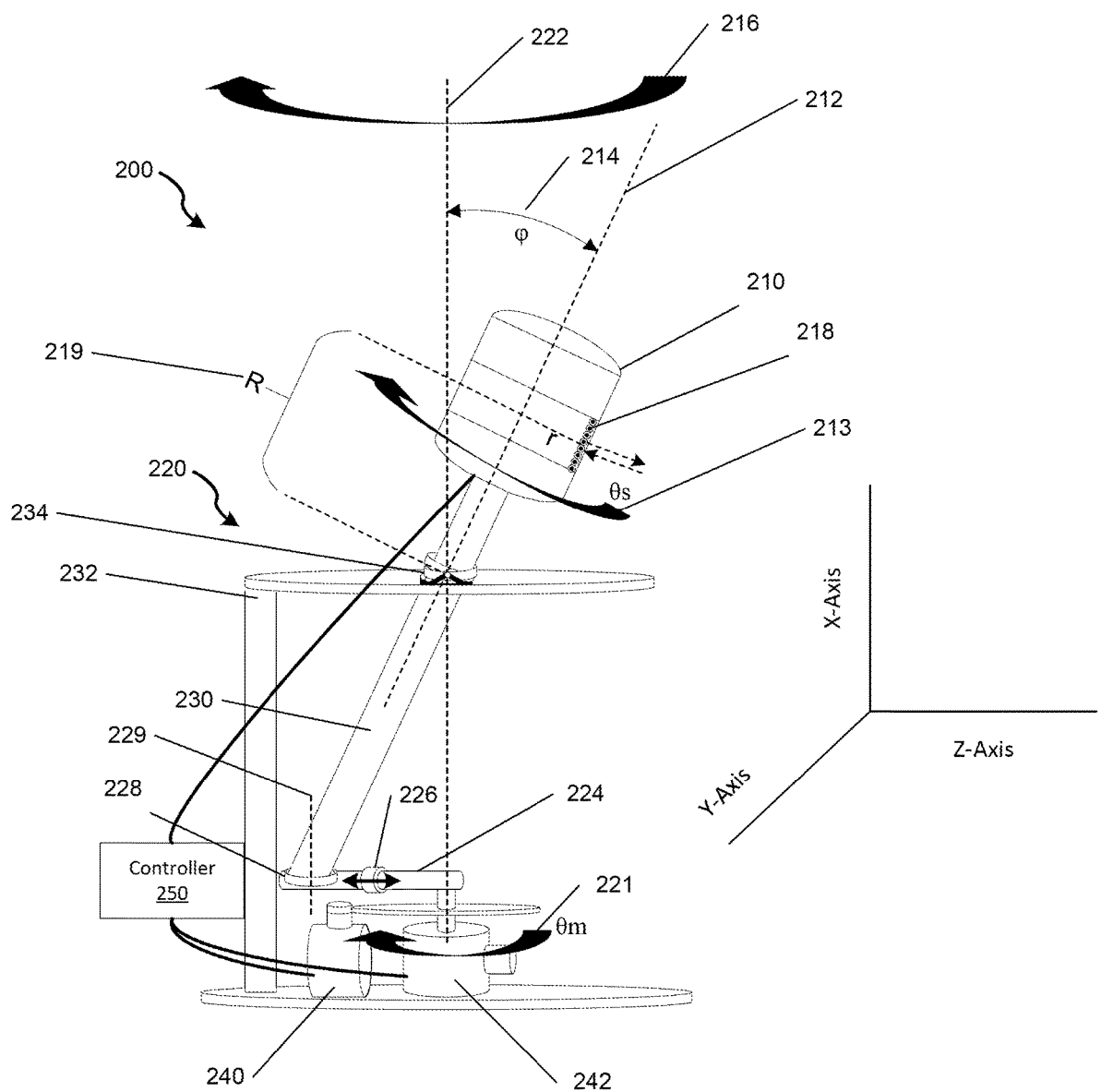
FIG. 2 illustrates an actuator including a mount, a stabilizer, a rotator, an encoder, and a controller, the mount configured to mount a spinning sensor according to an example embodiment.
Figure 3A:
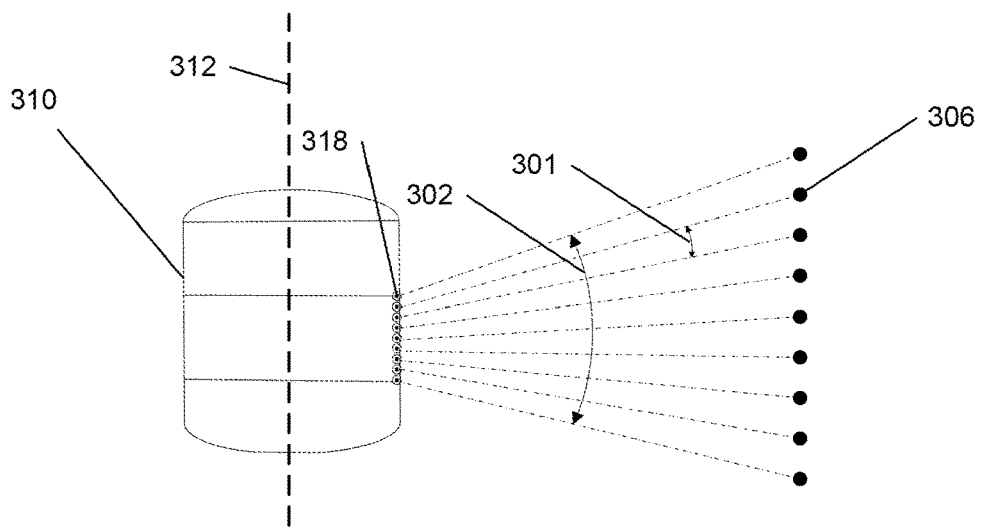
FIGS. 3A and 3B illustrate a spinning sensor according to an example embodiment.
Figure 3B:
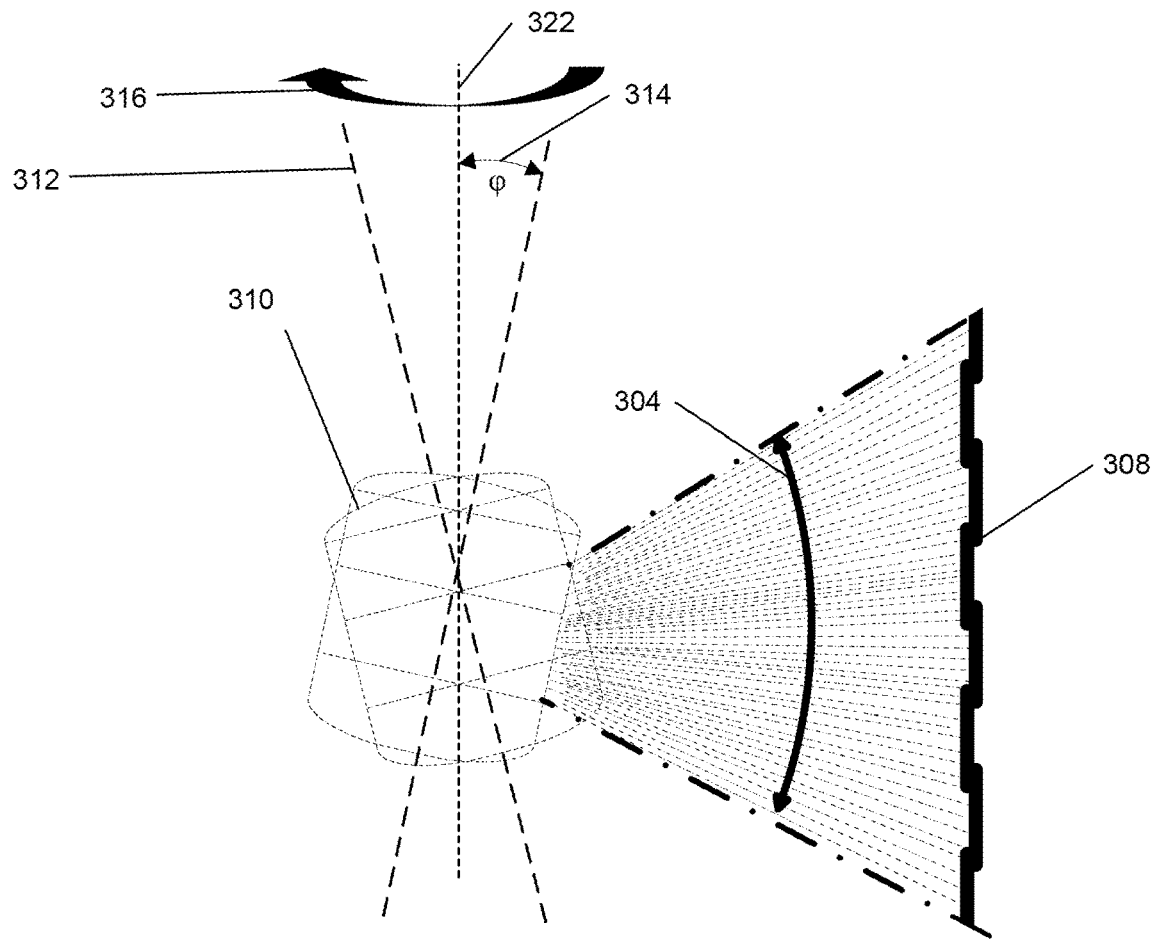

The mount can support a sensor such as a spinning LIDAR (see also the description of FIGS. 3A and 3B for more details on operation of an example spinning LIDAR sensor). Example spinning LIDAR sensors include a Velodyne® VLP-16. Such a sensor can spin at a range of rates, such as 5 Hz-20 Hz (e.g., 300-1200 rpms). The rotation of the mount 120, based on the rotator/actuator 140, is independently controllable from the rotation of the sensor. In example embodiments, the rotator 140 can rotate on the order of one revolution per five seconds, and can be varied over time (e.g., a non-continuous, or stepped, rotational movement). The rotation rate of the rotator 140 can be varied through a gear set or other mechanical setup (see FIG. 2), to affect speed, precision, and/or accuracy of the mount rotation. Similar mechanical setup or approaches can be applied when obtaining the mount rotation angle, either directly from the rotator 140 (e.g., by using a servo motor having direct access to servo angle information), or by using an encoder (not shown in FIG. 1; see FIG. 2) that can be directly or indirectly coupled to sense rotation angles of the mount 120. In an example embodiment, the rotator 140 can apply stepped rotation, to actively rotate the mount 120 during times when the sensor 110 is not actively scanning, but to hold the mount 120 still during times when the sensor 110 is actively scanning. An approach can include alternating between holding the mount 120 still while performing an active sensor rotation to collect one sensor rotation's worth of data, then incrementally and partially rotating the mount 120 while disregarding data during a passive sensor rotation(s) that occur during mount rotation, and alternate in that manner. In an example embodiment, the spinning sensor 110 is controlled and sensor information is exchanged via an Ethernet connection, and the mount rotation control and mount rotation angle encoder data is exchanged via universal serial bus (USB) connection. However, alternate techniques can be used to exchange information and control signals with the sensor 110 and/or rotator 140 (or other devices not shown in FIG. 1, such as the encoder of FIG. 2). For example, the sensor 110 can involve wireless transmission of sensed data to a receiver, e.g., via Bluetooth or Wi-Fi.

The actuator 100 achieves improved sensor operation, e.g., by causing the sensor 110 to obtain transformable sensor information corresponding to an increased composite FOV and an increased composite resolution. The sensor information is transformable based on information from the sensor 110 and from the rotator 140, in a repeatable and predicable manner. For example, rotation of the mount about the mount rotation axis 122 results in an increase in vertical resolution, by virtue of the inclination angle 114. Furthermore, the rate of rotation of the sensor 110 coupled with the rate of rotation of the rotator 140, can result in an increase in horizontal resolution (e.g., where timing of the sensor imaging pulses, coupled with the rotation rates of the sensor and mount, causes successive passes of the laser to illuminate different horizontal locations in the environment, in addition to different vertical locations due to the inclination angle 114 and rotator rotation). In an example embodiment, a system and/or controller can read the uncompensated sensor information from the sensor 110, read the mount rotation angle 121 from the rotator (or encoder), and transform the uncompensated sensor information into transformed sensor information as a function of the mount rotation angle 121.

Also included in FIG. 1 is a rotating support portion 130, which supports the sensor 110 while also rotating about the rotation axis 122, based on rotational contribution by the mount 120. Accordingly, determining the transformed sensor information can involve accounting for rotation of the rotating support portion 130, whose rotational contribution can be canceled out of the transformed sensor information. However, in embodiments where the sensor 110 includes wired communication and power lines, additional mechanical accommodation is used, such as slip-ring bearings, to transfer data and power across the slip rings thereby avoiding binding of signal wires from the sensor 110 that would otherwise wind around the rotating support portion 130. Alternately, the sensor 110 can use wireless signal transmission and battery power to avoid a need to accommodate the signal and power lines.

FIG. 2 illustrates a system 200 including a mount 220 and a rotator 240 configured to mount a spinning sensor 210 according to an example embodiment. The system 200 is configured to generate transformed sensor information, based on a function of the mount rotation angle 221. The system 200 actuates the sensor 210 based on a mount 220, including an offset portion 224 which extends laterally from a rotation axis 222 about which the mount 220 is configured to rotate, and a support portion 230, which extends from the offset portion 224 to support the rotatable sensor 210. The sensor 210 includes an array of emitters/receivers 218, and rotates about a sensor axis 212 oriented at a non-zero inclination angle 214 relative to the rotation axis 222. A stabilizer 232 includes a pivot 234 (illustrated as an example embodiment of a two-axis gimbal). The example embodiment of FIG. 2 includes a pivot 234 that is configured to prevent the support portion 230 from rotating along with the offset portion 224. The pivot 234 provides a pivot fulcrum for the support portion 230 of the mount 220 to precess about the rotation axis 222. The rotator 240 is configured to rotate the mount 220 (e.g., the offset portion 224) about the rotation axis 222, resulting in an orbital motion of an end of the support portion 230, thereby causing the sensor axis 212 to precess about the rotation axis 222 at the inclination angle $\varphi$ 214. This results in an orbital wobble motion of the sensor 210. An encoder 242 is configured to identify a mount rotation angle $\theta_m$ 221 about the rotation axis 222. A controller 240 is configured to generate transformed sensor information based on transforming uncompensated sensor information (obtained from the array of emitters/receivers 218) as a function of the mount rotation angle 221 and the inclination angle 214.

In example embodiments, the sensor 210 can be a spinning LIDAR including a plurality of laser emitters/receivers 218. For example, the LIDAR can include 16 lasers that can be used to detect approximately 400,000 data points per second. For the sake of simplicity, FIG. 2 illustrates a single sensor distance 219, i.e., R, corresponding to a distance along the sensor axis 212 from the pivot 234 to a midpoint of the sensor 210. However, the system 200 can operate based on a plurality of individual distances, e.g., $R_1$, $R_2$, $R_3$ ... $R_n$, corresponding to n=16 total number of lasers. The illustrated example shows a single R for a laser emitter/sensor located approximately at the midpoint of the sensor 210. However, for purposes of transforming the uncompensated/raw sensor information, each sensor/emitter of the array of emitters/receivers 218 would use its corresponding $R_n$ value when performing data transformations. Similarly, the data transformations can incorporate the value r (radius of the sensor 210) to precisely account for the specific position of each sensor/emitter, when calculating the offset/tilt of the sensor 210 generally.

The sensor distance R 219 is established relative to the pivot 234, because the pivot 234 represents the intersection between the sensor axis 212 and the mount rotation axis 222, a point about which the sensor axis 212 precesses. In the illustrated example of FIG. 2, the intersection is located below the sensor. However, alternate examples can use pivot points located elsewhere, such as above the sensor or even a virtual pivot point located within the sensor itself (see, e.g., FIG. 3B illustrating the intersection of the sensor axis 312 and the mount rotation axis 322 located within the sensor 310).

The offset portion 224 of the mount 220 extends laterally from the rotation axis 222, and can be used to establish the inclination angle 214. The plurality of sensor axis orientations 216 are a function of the inclination angle 214. The example embodiment of FIG. 2 illustrates an offset portion 224 having an adjuster 226, to vary a length of the offset portion 224 to adjust the inclination angle 214. Accordingly, the adjuster 226 enables fine adjustments to vary the effective FOV and effective resolution of the system 200.

The mount 220 includes a support portion 230, which can serve as a support arm extending from the offset portion 224 to the sensor 210. In the illustrated example embodiment, the support portion 230 is prevented from rotating along with the offset portion 224 of the mount 220, to decouple sensor rotation 213 from mount rotation 221. A pivot 234 is placed in the stabilizer 232, and configured to allow swaying and wobbling motions of the support portion 230 consistent with precession of the sensor axis 212, while preventing rotation of the support portion 230. In the illustrated example embodiment, the pivot 234 is a two-axis gimbal. Because the support portion 230 is prevented from rotating, the support portion 230 is rotatably coupled to the offset portion 224 via a bearing 228.

The bearing 228 of the offset portion 224 is shown as a pivotable bearing, to appropriately accommodate the relative pivoting movements between the support portion 230 (which pivots) and the offset portion 224 (which is prevented from pivoting), while allowing relative rotational differences between the offset portion 224 (which rotates) and the support portion 230 (which is prevented from rotating). In an example embodiment, the bearing 228 is a spherical plain bearing, although alternative couplings are contemplated that allow for pivotally and rotatably coupling the offset portion 224 and support portion 230, to allow precession of the support portion 230 and sensor 210, while preventing the support portion 230 from rotating about the sensor axis 212. A bearing rotation axis 229 is aligned parallel with the rotation axis 222, and the bearing 228 is configured to enable the support portion 230 of the mount 220 to pivot relative to the offset portion 224 during rotation of the rotator 240. Although the offset portion 224 is illustrated generally as an arm or linkage, alternate examples can use a disk-shaped or other type of offset portion 224. For example, the illustrated dedicated offset portion 224 can be omitted, and the bearing 228 can be set directly into the large gear of the gear set (with the size of the gear set adjusted to provide a proper displacement location for the bearing relative to the rotation axis 222).

In the example embodiment of FIG. 2, the actuator includes an angular encoder 242 to identify the mount rotation angle 221 about the rotation axis 222. The rotator 240 is coupled via a gear set to the mount 220 non-coaxially with the rotation axis 222, in contrast to the encoder 242 which is directly coupled coaxially with the rotation axis 222, to directly identify the mount rotation angle 221. The gear set enables a step-down conversion of the rotation provided by the rotator 240, enabling precise and accurate rotational control. In alternate examples, the positions of the rotator 240 and the encoder 242 can be swapped, and alternative couplings can be used in place of the illustrated step-down gear set. Although separate/discrete rotator 240 and encoder 242 are illustrated, alternate examples can use a combined rotator/encoder, such as a precision servomotor.

FIGS. 3A and 3B illustrate a spinning sensor according to an example embodiment. FIG. 3A shows the sensor 310 at a default/native orientation in which the sensor axis 312 is vertical. The sensor 310 includes an array of emitters/receivers 318, which are situated on a surface of the spinning sensor so that the array 318 is rotated around the rotation axis 322 of the sensor 310. Each emitter of the array 318 is specifically oriented to establish a beam divergence angle 301. Because the beam divergence angle 301 is greater than zero, the plurality of beams sent out by the array 318 are spaced apart from each other and diverge, establishing a vertical field-of-view (FOV) 302. Accordingly, as distance from the sensor 310 increases, the beams diverge further, which establishes a native resolution 306 of the sensor 310. Spinning the sensor 310 sweeps the beams around the environment, establishing sensor information corresponding to lines of contours of the environment. However, fine details of the environment that are located between the sensed points/lines are not detectable for the given vertical orientation of the sensor axis 312. Thus, the static position of the sensor axis 312 limits the sensor 310 to the native resolution 306, and the native FOV 302, which both correspond to the beam divergence angle 301 between adjacent beams.

However, FIG. 3B illustrates the sensor 310 corresponding to two sensor axis orientations 316. The illustrated sensor axis orientations 316 are shown for simplicity, whereas the example embodiments enable the sensor 310 to experience a continuous range of sensor axis orientations 316 as the sensor 310 orbits/pivots/precesses about the rotation axis 322 (e.g., by operation of the mount 220 shown in FIG. 2). Accordingly, the precession of the sensor 310 results in collection of sensor information that can be transformed to generate transformed sensor information associated with an increased composite FOV 304 obtained at an increased composite resolution 308, compared to the native FOV and resolution of a stationary rotating sensor shown in FIG. 310.

As illustrated, the inclination angle 314 can be chosen to allow the emitted beams to "sweep" vertically as the sensor 310 precesses, thereby filling in any inter-beam gaps that previously existed as shown in FIG. 3A. For example, to achieve full coverage sweep, the mount can be configured to provide the inclination angle 314 greater than or equal to half the beam divergence angle 301. In such a configuration, the lower half of the gap is swept and filled in by the beams during the precessional operation of the spinning sensor 310 as it leans closer toward a given target of the imaged environment, and the upper half of the gap is swept and filled in by the beams as the sensor 310 leans away from the target.

The inclination angle 314 can be chosen to have a smaller angle than half of the beam divergence angle 301, allowing inter-beam gaps to remain while still enabling some beam sweep. The inclination angle 314 can be chosen to have a larger angle than half of the beam divergence angle 301, thereby enabling different beams to overlap the same target section of the environment to provide robust coverage (as illustrated by the overlapping lines representing the composite resolution 308 of FIG. 3B, in contrast to the non-overlapping dots representing the native resolution 306 of FIG. 3A). Thus, the example mount 220 enables the sensor 310 to operate as though it had a beam divergence angle less than the native beam divergence angle of the sensor, e.g., a beam divergence angle of zero, or even a negative beam divergence angle (i.e., overlapping adjacent beams) by virtue of the composite resolution 308 presented in the transformed sensor information obtained by the mount precessing the sensor 310. This results in an improved operation of the sensor 310 that effectively fills in the gaps between lasers, that would otherwise have been missed, thereby improving spatial resolution on the vertical axis resulting in higher resolution than the native sensor 310 was capable of delivering, providing high fidelity measurements while expanding the vertical FOV coverage.

Figure 4:
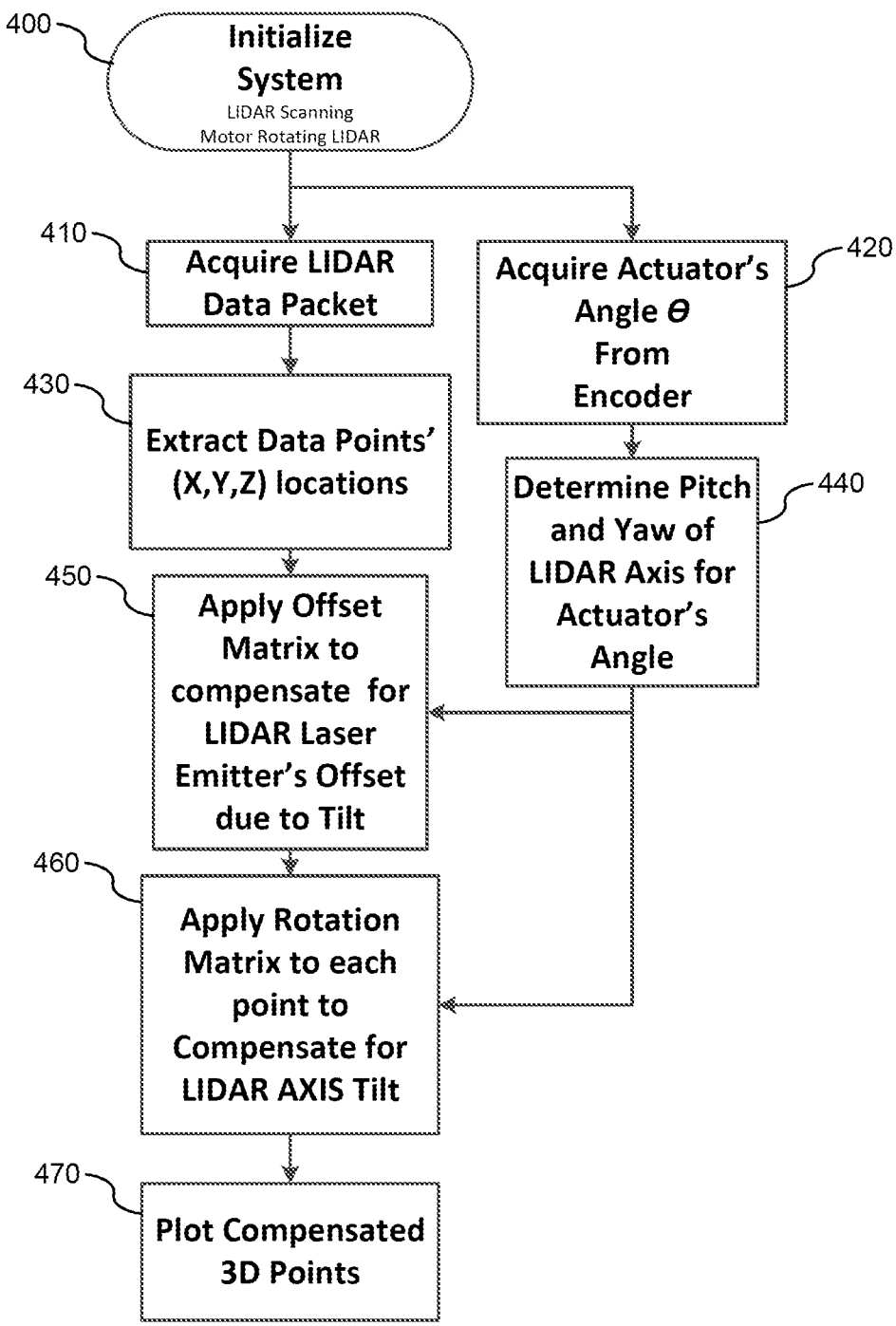
FIG. 4 illustrates an example flowchart to generate transformed sensor data according to an example embodiment.

FIG. 4 illustrates an example flowchart to generate compensated sensor data according to an example embodiment. In block 400, the system is initialized. For example, a LIDAR sensor begins scanning to acquire sensor information, and a rotator such as a motor rotates the LIDAR sensor.

In block 410, a LIDAR data packet is acquired. In an example embodiment, a controller acquires a data packet including laser return values, calibrated reflectivity values, azimuth values (rotational angle), a time stamp, and two factory bytes indicating the sensor model and the return mode (strongest, last, and dual). The data packet is 1248 bytes long and is sent on transmission port 2368. Each packet consists of a 42 byte header and a 1206 byte payload containing twelve blocks of 100-byte data records. The data is followed by a four-byte time stamp data and two factory bytes. The data packet is then combined with status and header data in a UDP packet and transmitted over the Ethernet protocol. The firing data is assembled into the packets in the firing order, with multi-byte values—azimuth, distance, timestamp—transmitted least significant byte first.

In block 420, the actuator's rotation angle is acquired. For example, a controller can read the output of an angular encoder, or the output of a combination servomotor. In block 430, the (X,Y,Z) coordinate locations of data points are extracted from the data packet. For example, the laser return value (distance) in the packet is used to determine a distance to the sensed point in the environment. The azimuth (rotational angle) is used to determine a direction in which the sensed point in the environment is located relative to the sensor orientation. Similarly, the particular one of the array of emitters establishes the elevational angle (based on the accumulated beam divergence angles from horizontal). Such distance and pair of separate angles (rotational angle, elevational angle) establish a spherical coordinate system reported by the sensor's data packet. The controller can then perform a mathematical transformation from a spherical coordinate system to a Cartesian coordinate system based on (X,Y,Z) coordinates. Accordingly, the native spherical data (represented by, e.g., distance $d^0$, rotational angle $\alpha^0$, and elevational angle $\omega^0$), can be converted to Cartesian coordinates ($x^0$, $y^0$, $z^0$) based on the following spherical-to-Cartesian conversion: Let x represent the vertical axis, let y represent the depth axis, and let z represent the horizontal axis. $x^0 = d^0 * COS(\omega^0)$, $y^0 = d^0 * COS(\omega^0) * SIN(\alpha^0)$, and $z^0 = d^0 * COS(\omega^0) * COS(\alpha^0)$. Such a conversion enables the controller to extract the uncompensated location coordinates from the data packet.

In block 440, the pitch and yaw of the LIDAR sensor axis are determined, as a function of the actuator's angle. For example, the adjuster of the offset portion of the mount can be used to establish the inclination angle, which establishes the pitch and yaw according to which the LIDAR sensor axis precesses.

In block 450, an offset matrix is applied to the uncompensated sensor information, to compensate for the sensor's offset due to the inclination angle. For example, the following calculations can use the variables illustrated in FIG. 2 as follows. The inclination angle φ 214 illustrated in FIG. 2, along with the mount rotation angle $\theta_m$ 221, and the sensor distances Run are then used to convert the uncompensated coordinates ($x^0$, $y^1$, $z^0$) to transformed sensor information corresponding to coordinates ($x^1$, $y^1$, $z^1$) as follows: $x^1 = R*SIN(\varphi)*COS(\theta)$, $y^1 = R*SIN(\varphi)*COS(\theta)$, and $z^1 = R*COS(\varphi)$.

The following variables and variable names are provided as follows, for use throughout the illustrated equations and matrix operations:

θ≡Mount Rotation Angle
R≡Sensor distance; LIDAR BaseSE Offset from Axis of Rotation
φ≡Inclination Angle; Maximum Slant Angle
($x^0$, $y^0$, $z^0$)≡Uncompenstated LIDAR data position Point Location
($x^1$, $y^1$, $z^1$)≡Transformed Sensor information
OFFSET MATRIX≡Used to Compensate for Translation Offset due to LIDAR Slant
TILTMATRIX≡Transform Points to correct (x, y, z) location due to Tilt of LIDAR Axis
PANMATRIX≡Transform Points to correct (x, y, z) location due to Pan of LIDAR Axis
ROTATIONMATRIX≡Transform Points to correct location due to Slant of LIDAR Axis
XTranslate≡XAxis Offset shift due to tilt of in LIDAR
YTranslate≡YAxis Offset shift due to tilt of in LIDAR
ZTranslate≡ZAxis Offset shift due to tilt of in LIDAR In an example implementation, Ztranslate=a length in meters between the base of the LIDAR sensor and the pivot/gimbal of the mount, e.g., corresponding to a sensor distance such as $R_{1 \ldots n}$ but adjusted to compensate for a location of a particular active one of the sensors in a sensor array of the sensor. Ytranslate=−Ztranslate*SIN(max slant angle)*SIN(mount rotation angle), and Xtranslate=−Ztranslate*SIN(max slant angle)*COS(mount rotation angle). Terminology such as slant angle can correspond to the inclination angle as expressed above.

An offset matrix can be provided as follows, and also can be used to convert the uncompensated coordinates ($x^0$, $y^0$, $z^0$) to transformed sensor information corresponding to coordinates ($x^1$, $y^1$, $z^1$):

$$\text{OFFSET MATRIX} = \begin{bmatrix} 1 & 0 & 0 & -XTranslate \\ 0 & 1 & 0 & -YTranslate \\ 0 & 0 & 1 & -ZTranslate \\ 0 & 0 & 0 & 1 \end{bmatrix}$$

$$(x^1, y^1, z^1) = \text{OFFSET MATRIX} * (x^0, y^0, z^0)$$

The above transformed sensor information ($x^1$, $y^1$, $z^1$) is thus obtained as a result of applying the offset matrix to the uncompensated coordinates ($x^0$, $y^0$, $z^0$), which should also correspond to the transformed sensor information ($x^1$, $y^1$, $z^1$) described above with respect to block 450, which is described as also being obtainable using an alternative approach. Accordingly, the various approaches described herein can accomplish the desired transformations and compensations using matrix manipulation, or trigonometry, or any other forms of adjusting for offsets in various coordinate systems. For example, the approaches generally describe translating between spherical and Cartesian coordinate systems while also applying compensations/translations and/or outputting the data for display. In alternate examples, the system can use the raw data from a given coordinate system, and apply the translations/compensations in the same coordinate system, and output the data for display in the same coordinate system. However, the embodiments described herein contemplate freedom to use any combination of coordinate systems and applications of translations and compensations in order to achieve the described enhancement to sensor performance based on actuation by the mount. In an example embodiment, the type of coordinate system and transformations can be chosen based on the type and format of data provided by the sensor, and/or based on the type of tools (e.g., Mathcad®, Mathematica®, etc.) that can be implemented to perform calculations in a given system that is to perform the translations based on mount actuation.

In block 460, a rotation matrix is applied to the offset compensated sensor information, to compensate for the sensor's altered angle due to the inclination angle. For example, let φ=tiltangle, and let θ=panangle:

$$TILTMATRIX = \begin{bmatrix} \cos(tiltangle) & 0 & \sin(tiltangle) & 0 \\ 0 & 1 & 0 & 0 \\ -\sin(tiltangle) & 0 & \cos(tiltangle) & 0 \\ 0 & 0 & 0 & 1 \end{bmatrix}$$

$$PANMATRIX = \begin{bmatrix} 1 & 0 & 0 & 0 \\ 0 & \cos(panangle) & -\sin(panangle) & 0 \\ 0 & \sin(panangle) & \cos(tiltangle) & 0 \\ 0 & 0 & 0 & 1 \end{bmatrix}$$

$$(x, y, z) = TILTMATRIX * PANMATRIX * (x^1, y^1, z^1)$$

In block 470, the compensated sensor data is plotted as 3D points. For example, the compensated/transformed sensor information, represented by the data coordinates $(x^1, y^1, z^1)$, is plotted to include additional higher resolution and FOV, compared to the uncompensated/raw sensor data of a stationary rotating sensor, represented as coordinates $(x^o, y^o, z^o)$. For example, software can calculate/transform and otherwise interpret the coordinate information to display and analyze the data acquired by the LIDAR sensor, achieving higher image resolution/fidelity based on obtaining "between pixel" orientations on a continuous rolling basis.

Figure 5:
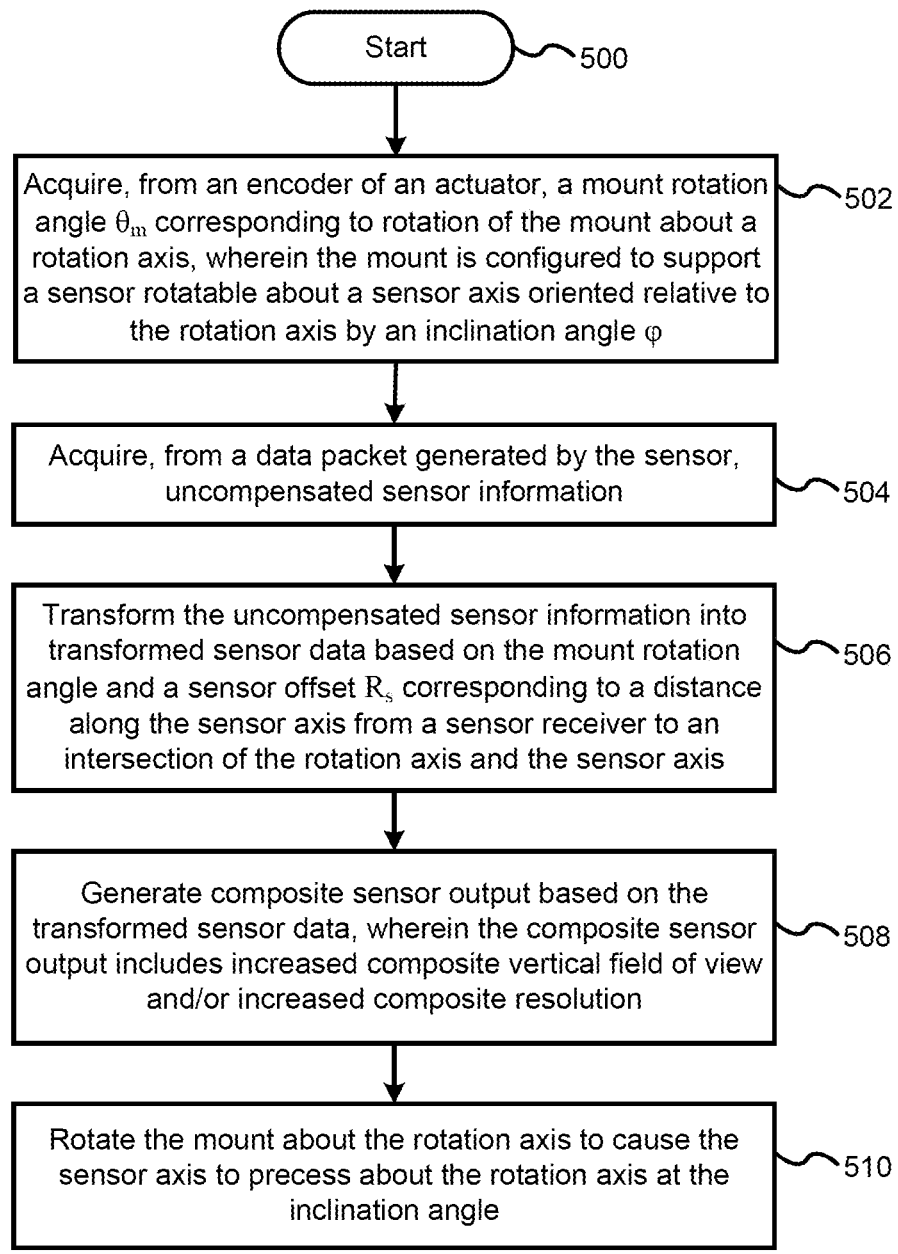
FIG. 5 illustrates an example flowchart to generate transformed sensor data according to an example embodiment.

FIG. 5 illustrates an example flowchart to generate compensated sensor data according to an example embodiment. Flow starts at block 500.

In block 502, a mount rotation angle, corresponding to rotation of the mount about a rotation axis, is acquired from an encoder of an actuator. The mount is configured to support a sensor rotatable about a sensor axis oriented relative to the rotation axis by an inclination angle. For example, as illustrated in FIG. 2, a controller 250 queries the angular position reported by the encoder 242.

In block 504, uncompensated sensor information is acquired from a data packet generated by the sensor. For example, the controller 250 queries the data packet reported by the spinning sensor 210.

In block 506, the uncompensated sensor information is transformed into transformed sensor data based on the mount rotation angle and a sensor offset corresponding to a distance along the sensor axis from a sensor receiver to an intersection of the rotation axis and the sensor axis. For example, the values of R and 0 can be identified and used as described above to perform the transformation. The transformation involves transforming the uncompensated sensor information based on matrix multiplication of the uncompensated sensor information with a first matrix representing an offset transformation of sensor coordinates, a second matrix representing an inclination transformation of sensor coordinates, and a third matrix representing a rotation transformation of sensor coordinates.

In block 508, composite sensor output is generated based on the transformed sensor data. The composite sensor output includes at least one of a composite vertical field of view greater than an uncompensated vertical field of view of the sensor, or a composite resolution greater than an uncompensated resolution of the sensor. For example, the transformed sensor data involves data that effectively fills in the gaps established by the fixed beam divergence angle set by the native sensor, and which also extends the FOV beyond the upper and lower beams of the native sensor, by virtue of the precession of the sensor axis about the mount rotation axis set at the adjustable inclination angle. The inclination angle can be adjusted to fully fill the gaps by having a value at least half of the beam divergence angle, and inclination angles greater than that value enable the beams to overlap, effectively achieving a negative beam divergence angle.

In block 510, the mount is rotated about the rotation axis to cause the sensor axis to precess about the rotation axis at the inclination angle. For example, a rotator can operate on a single plane of rotation to accomplish the entire actuation of the mount. The rotator can operate continuously in some embodiments, and can operate in a stepped fashion in other embodiments. For example, the rotator can be configured to hold the mount still during active rotation of the spinning sensor corresponding to sensor information collection, and the rotator can then rotate the mount incrementally during passive rotation of the spinning sensor, corresponding to disregarding of sensor information while the mount is rotating. This enables the spinning sensor to stabilize at a given sensor axis orientation, isolating the spinning sensor from possible perturbations introduces by movement of the sensor's mount. Furthermore, the rate of rotation of the mount can be fixed as a function of the rate of rotation of the sensor. For example, the rotator can be configured to rotate the mount at a mount rotation rate relative to a sensor rotation rate to avoid completing a mount rotation approximately concurrently with completion of a sensor rotation, thereby ensuring that the horizontal coverage of the spinning sensor provides ample coverage/horizontal resolution.

While a number of exemplary embodiments of the present invention have been described, it should be appreciated that the present invention provides many applicable inventive concepts that can be embodied in a wide variety of ways. The exemplary embodiments discussed herein are merely illustrative of ways to make and use the invention and are not intended to limit the scope of the invention. Rather, as will be appreciated by one of skill in the art, the teachings and disclosures herein can be combined or rearranged with other portions of this disclosure and the knowledge of one of ordinary skill in the art.

Terms and phrases used in this document, unless otherwise expressly stated, should be construed as open ended as opposed to closed—e.g., the term "including" should be read as meaning "including, without limitation" or the like; the term "example" is used to provide exemplary instances of the item in discussion, not an exhaustive or limiting list thereof; the terms "a" or should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Furthermore, the presence of broadening words and phrases such as "one or more," "at least," "but not limited to," or other similar phrases, should not be read to mean that the narrower case is intended or required in instances where such broadening phrases may be absent. Any headers used are for convenience and should not be taken as limiting or restricting. Additionally, where this document refers to technologies that would be apparent or known to one of ordinary skill in the art, such technologies encompass those apparent or known to the skilled artisan now or at any time in the future.

What is claimed is:

1. An actuated sensor system comprising:
a sensor that is a spinning LIDAR and that spins about a sensor axis;
a mount configured to support the sensor and configured to orient the sensor axis at a non-zero inclination angle relative to a rotation axis of the mount; and
a rotator configured to rotate the mount about the rotation axis to cause the sensor axis to precess about the rotation axis;
wherein the sensor includes an array of emitters to generate a plurality of beams associated with a beam divergence angle between adjacent beams, and wherein the mount is configured to provide the inclination angle greater than or equal to half the beam divergence angle.

2. The actuated sensor system of claim 1, wherein the mount includes an offset portion which extends laterally from the rotation axis to establish the inclination angle.

3. The actuated sensor system of claim 2, wherein the offset portion includes an adjuster to vary a length of the offset portion to adjust the inclination angle.

4. The actuated sensor system of claim 2, wherein the mount includes a support portion which extends from the offset portion to the sensor and which is prevented from rotating along with the mount, to decouple sensor rotation from mount rotation.

5. The actuated sensor system of claim 4, further comprising a stabilizer including a pivot to isolate the support portion of the mount and prevent the support portion from rotating with the mount, while allowing the support portion to pivot.

6. The actuated sensor system of claim 5, wherein the pivot is a two-axis gimbal.

7. The actuated sensor system of claim 1, wherein the mount includes a support portion configured to support the sensor and configured to rotate about the rotation axis based on rotational contribution by the mount.

8. The actuated sensor system of claim 1, further comprising an encoder to identify a mount rotation angle about the rotation axis.

9. The actuated sensor system of claim 1, wherein the mount is configured to cause the sensor to operate corresponding to a composite vertical field of view greater than a native vertical field of view of the sensor.

10. The actuated sensor system of claim 1, wherein the sensor operates according to a composite resolution greater than a native resolution of the sensor, based on the sensor axis precessing about the rotation axis.

11. The actuated sensor system of claim 10, wherein the composite resolution greater than a native resolution corresponds to the sensor operating with an effective beam divergence angle that is less than a native beam divergence angle of the sensor.

12. The actuated sensor system of claim 1, wherein the rotator is configured to hold the mount still during active rotation of the sensor corresponding to sensor information collection, and rotate the mount incrementally during passive rotation of the sensor corresponding to disregarding of sensor information.

13. The actuated sensor system of claim 1, wherein the rotator is configured to rotate the mount at a mount rotation rate relative to a sensor rotation rate to avoid completing a mount rotation concurrently with completion of a sensor rotation.

14. The actuated sensor system of claim 1, wherein the rotator is configured to rotate the mount at a mount rotation rate relative to a sensor rotation rate to complete a mount rotation concurrently with completion of a sensor rotation.

15. An actuated sensor system to generate transformed sensor information, comprising:
a sensor that is a spinning LIDAR and that spins about a sensor axis;
a mount including an offset portion, which extends laterally from a rotation axis about which the mount is configured to rotate, and a support portion, which extends from the offset portion to support the sensor and orient the sensor axis at a non-zero inclination angle relative to the rotation axis;
a stabilizer including a two-axis gimbal configured to prevent the support portion from rotating along with the mount and to provide a pivot fulcrum for the support portion of the mount to precess about the rotation axis;
a rotator configured to rotate the mount about the rotation axis, to cause the sensor axis to precess about the rotation axis at the inclination angle; and
an encoder configured to identify a mount rotation angle about the rotation axis; and
a controller configured to transform uncompensated sensor information, as a function of the mount rotation angle and the inclination angle, into transformed sensor information;
wherein the sensor includes an array of emitters to generate a plurality of beams associated with a beam divergence angle between adjacent beams, and wherein the mount is configured to provide the inclination angle greater than or equal to half the beam divergence angle.

16. The actuated sensor system of claim 15, wherein the rotator is coupled to the mount non-coaxially with the rotation axis via a gear set, and wherein the encoder is coupled coaxially with the rotation axis to directly identify the mount rotation angle.

17. The actuated sensor system of claim 15, wherein the offset portion of the mount includes a bearing to pivotally and rotatably couple the support portion of the mount to precess the support portion while preventing the support portion from rotating.

18. The actuated sensor system of claim 17, wherein a bearing rotation axis is aligned parallel with the rotation axis, and the bearing is configured to enable the support portion of the mount to pivot relative to the offset portion during rotation.

19. A method to generate transformed sensor data, comprising:
acquiring, from an encoder of an actuator, a mount rotation angle corresponding to rotation of a mount about a rotation axis, the mount being configured to support a sensor that is a spinning LIDAR and that spins about a sensor axis oriented relative to the rotation axis by an inclination angle;

acquiring, from a data packet generated by the sensor, uncompensated sensor information;

transforming the uncompensated sensor information into transformed sensor data based on the mount rotation angle and a sensor offset corresponding to a distance along the sensor axis from a sensor receiver to an intersection of the rotation axis and the sensor axis;

generating composite sensor output based on the transformed sensor data, wherein the composite sensor output includes a composite resolution greater than an uncompensated native resolution of the sensor; and rotating the mount about the rotation axis to cause the sensor axis to precess about the rotation axis at the inclination angle;

wherein the sensor includes an array of emitters to generate a plurality of beams associated with a beam divergence angle between adjacent beams, and wherein the mount is configured to provide the inclination angle greater than or equal to half the beam divergence angle.

20. The method of claim 19, further comprising transforming the uncompensated sensor information based on matrix multiplication of the uncompensated sensor information with a first matrix representing an offset transformation of sensor coordinates, a second matrix representing an inclination transformation of sensor coordinates, and a third matrix representing a rotation transformation of sensor coordinates, to generate the transformed sensor data.

\* \* \* \* \*